(12) United States Patent
Parthasarathy

(10) Patent No.: US 6,944,745 B2
(45) Date of Patent: Sep. 13, 2005

(54) EXCEPTION HANDLING FOR SINGLE INSTRUCTIONS WITH MULTIPLE DATA

(75) Inventor: Rajesh S. Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 10/229,317

(22) Filed: Aug. 26, 2002

(65) Prior Publication Data

US 2004/0039902 A1 Feb. 26, 2004

(51) Int. Cl.[7] .............................. G06F 9/44; G06F 15/80
(52) U.S. Cl. .......................................... 712/22; 712/244
(58) Field of Search .................................. 712/22, 244

(56) References Cited

U.S. PATENT DOCUMENTS

| 6,038,652 | A | * | 3/2000 | Phillips et al. ................. 712/22 |
| 6,085,312 | A |   | 7/2000 | Abdallah et al. |
| 6,378,067 | B1 | * | 4/2002 | Golliver et al. .............. 712/244 |

* cited by examiner

*Primary Examiner*—Daniel H. Pan
(74) *Attorney, Agent, or Firm*—Fish & Richardson P.C.

(57) ABSTRACT

Processing a micro-operation may include providing information to an event handler indicating which of multiple sets of data caused events during processing of a single instruction on multiple sets of data in parallel. The event handler may access the provided information to simplify handling of data sets that did not cause an event. Handling the data sets may include the event handler determining a result for data sets that caused events, accessing results determined outside of the event handler for data sets that did not cause an event, and accumulating all of the results.

37 Claims, 4 Drawing Sheets

EXCEPTION HANDLING FOR SINGLE INSTRUCTIONS WITH MULTIPLE DATA

BACKGROUND

Various disclosed implementations relate generally to executing processor instructions, and particular implementations relate more specifically to handling events that occur during the processing of an instruction that is to be performed on multiple sets of data. An instruction may be performed on multiple sets of data in, for example, a multimedia application.

Single Instruction/Multiple Data ("SIMD") technology allows a single instruction to be performed on multiple sets of data. The instruction can be performed on the multiple sets of data in parallel, thus reducing total execution time compared to performing the instruction serially on each of the sets of data. SIMD instructions are often used with systems that provide packed data formats that allow, for example, a register to be logically divided into multiple data fields. For example, a 128-bit register A can be logically divided into four 32-bit registers A1, A2, A3, and A4. Assuming there are two such registers, A and B, a SIMD add instruction using these registers, for example, ADD A, B, specifies that an add operation is to be performed on each of the four sets of logical registers contained in registers A and B. The four add operations are A1+B1, A2+B2, A3+B3, and A4+B4.

Streaming SIMD Extensions ("SSE") and SSE2 are two examples of SIMD instruction sets. When these or other SIMD instructions are processed, various events may occur that interrupt the execution of the instruction and need to be handled.

DETAILED DESCRIPTION

Figure 1:
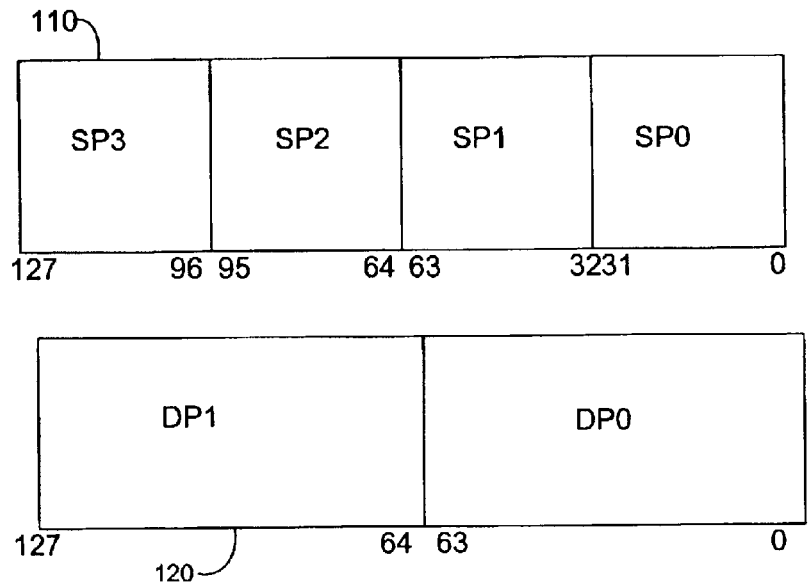
FIG. 1 is a block diagram showing two logical divisions of a 128-bit register.

SIMD floating point operations are susceptible to a variety of events, also referred to, for example, as exceptions, faults, or violations. Examples of such events include: (1) denormal events, indicating, for example, that an extremely small number is being used; (2) invalid events, indicating an invalid data type or invalid number such as, for example, an undefined number; (3) precision events; (4) exponent underflow events; (5) exponent overflow events; and (6) divide by zero events. Handling such events generally requires the use of more precision in performing the computations, with the result of the computations being truncated and returned to the original precision and provided to the destination.

Many systems have hardware dedicated to executing SIMD instructions. However, for the hardware to deal with events, the hardware may need to have additional circuitry for handling the event, including additional bits associated with each data element in order to provide the increased precision required. If the events are handled in hardware, then the hardware is typically made more complex and requires more area. Additionally, depending on the design, the hardware may also increase the latency for the execution of instructions that do not cause an event. According to Amdahl's law, increasing the latency of non-eventing SIMD operations, which are more frequent, by reducing the latency of eventing SIMD operations, which are less frequent, will diminish performance. As a result, hardware designs generally trade-off the performance of eventing situations for a simpler design and faster execution of non-eventing operations. If the hardware does not have to deal with events, however, then the complexity of the hardware may be reduced.

One alternative to handling events in hardware is to handle events in microcode. Hardware can note that there is an event in one of the multiple sets of data and call microcode to handle the event. Microcode is generally slower than hardware, but this tradeoff is generally accepted because it allows for a simpler hardware design, and because events are often expected to be infrequent.

Regardless of whether events are handled in hardware, microcode, or otherwise, handling events generally introduces latency into the execution of an instruction. As an example, in one system, a packed single-precision add instruction requires approximately five clock cycles to complete, but handling a SIMD event takes on the order of 1800 clock cycles to complete.

Part of the above latency may be caused by the microcode event handler having to process each of the multiple sets of data, even those data sets that did not cause an event. As an example, in many applications that use SIMD instructions, only one of the multiple sets of data actually causes an event for any given instruction. However, in one system the microcode event handler does not know which data set caused an event because the hardware in that system does not isolate the set of data that caused an event, and, as a result, the microcode determines which data set(s) caused an event by processing each data set.

In certain out-of-order implementations, some vital information (for example, sources used, and whether the source is from a register or memory) about the eventing instruction is lost by the time the event is signaled. As a result, in order to handle the event, the microcode event handler of these implementations performs a number of operations, including, for example, (i) fetching the instruction from memory, (ii) decoding the instruction to determine the sources, arithmetic operation, and data size, and (iii) detecting, for each data set, possible eventing conditions and handling them serially. Handling an event includes determining the appropriate exception flags that would have to be set (for example, setting the denormal exception flag for denormal events) and computing the correct result. Even for data sets that do not have events, the microcode of these systems has to go through the event detection process and compute the results. The microcode event handler of these implementations further performs the operations of, for example, (iv) updating the architectural exception flags, and (v) transferring control to a software handler if there are unmasked exceptions, or, if all exceptions are masked, updating the architectural destination register and resuming program execution.

The above latency may also be caused, in part, by the microcode event handler processing the multiple sets of data serially, rather than in parallel. As explained above, the event handler typically needs additional precision. In one system, the microcode event handler uses an x87 extended precision floating point format to handle events. However, the x87 extended precision floating point format only deals with one set of data at a time, so each set of the multiple sets of data must be handled serially.

The above latency may be exacerbated, for the user, by occurring frequently. Many applications deal with denormal data and will, accordingly, signal denormal events repeatedly, thereby causing the latency to be introduced repeatedly.

Systems may also allow various events to be masked by software. In one implementation, if the event that occurs is masked and the corresponding exception flag is set, then hardware is capable of returning the masked response in most situations. In such situations, the destination register is updated with the masked response and there is no break in program execution. If, however, the exception flag is not set (and the event is masked), then hardware will call the microcode event handler to set the exception flag. Once the exception flags are set, they will remain set until explicitly cleared by software. Thus, for a given masked event, if the exception flags are already set, and if the hardware is capable of returning the masked response for the given event, then the hardware does not call microcode.

As indicated above, in one implementation the hardware is capable of returning the masked response for most exceptions but not all. For example, hardware cannot return the masked results for denormal and exponent underflow events even when the corresponding exception flags are already set. In such cases, hardware requires microcode help to handle the event. When microcode sets the exception flags (if necessary) and returns the masked response, program execution is resumed without any intervention by software.

In one implementation, if the event that occurs is unmasked, the hardware always calls microcode because software intervention is required in order to handle unmasked exceptions. The microcode event handler will set the appropriate exception flags and transfer control to a macrocode event handler (also referred to as a software handler). The software handler is expected to handle the event and then to resume program execution. The microcode does not update the architectural destination register but only sets the exception flags before giving control to software. By having exceptions unmasked, software basically directs the hardware to give control back to the software on exceptions so that the software can choose to handle the event as it wishes.

FIG. 1 illustrates two logical divisions of a 128-bit register into fields that correspond to different data sets. Both logical divisions represent a packed format, that is, a format providing multiple sets of data, as opposed to a scalar format. Register 110 illustrates a "packed single" format, and is divided logically into four single-precision variables, SP0, SP1, SP2, and SP3. Register 120 illustrates a "packed double" format, and is divided logically into two double-precision variables, DP0 and DP1.

With the divisions just described, because the microcode is given no information as to which data set caused an event, the microcode must process, potentially, four data sets. Further, in many systems, as mentioned above, the microcode executes in a different architecture from the hardware, with the different architecture providing greater precision but not supporting SIMD instructions. Thus, the microcode event handler must process the data sets serially, as opposed to processing them in parallel. Even if the microcode finds a SIMD event in the first data set, the microcode often processes all four data sets in case another data set also caused, or would cause, an event.

A disclosed implementation uses hardware that keeps track of which data set(s) produced an event and passes this information to the microcode. The hardware is more complex because it must track event information for parallel processing of the instruction on multiple sets of data through the stages (e.g., issuance, execution, and retirement) of the instruction's life cycle. The microcode is also more complex, but it results in an implementation that may handle SIMD events more quickly. A decrease in processing time is particularly valuable in applications that cause a lot of SIMD events, such as is becoming more frequent with, for example, games.

Figure 2:
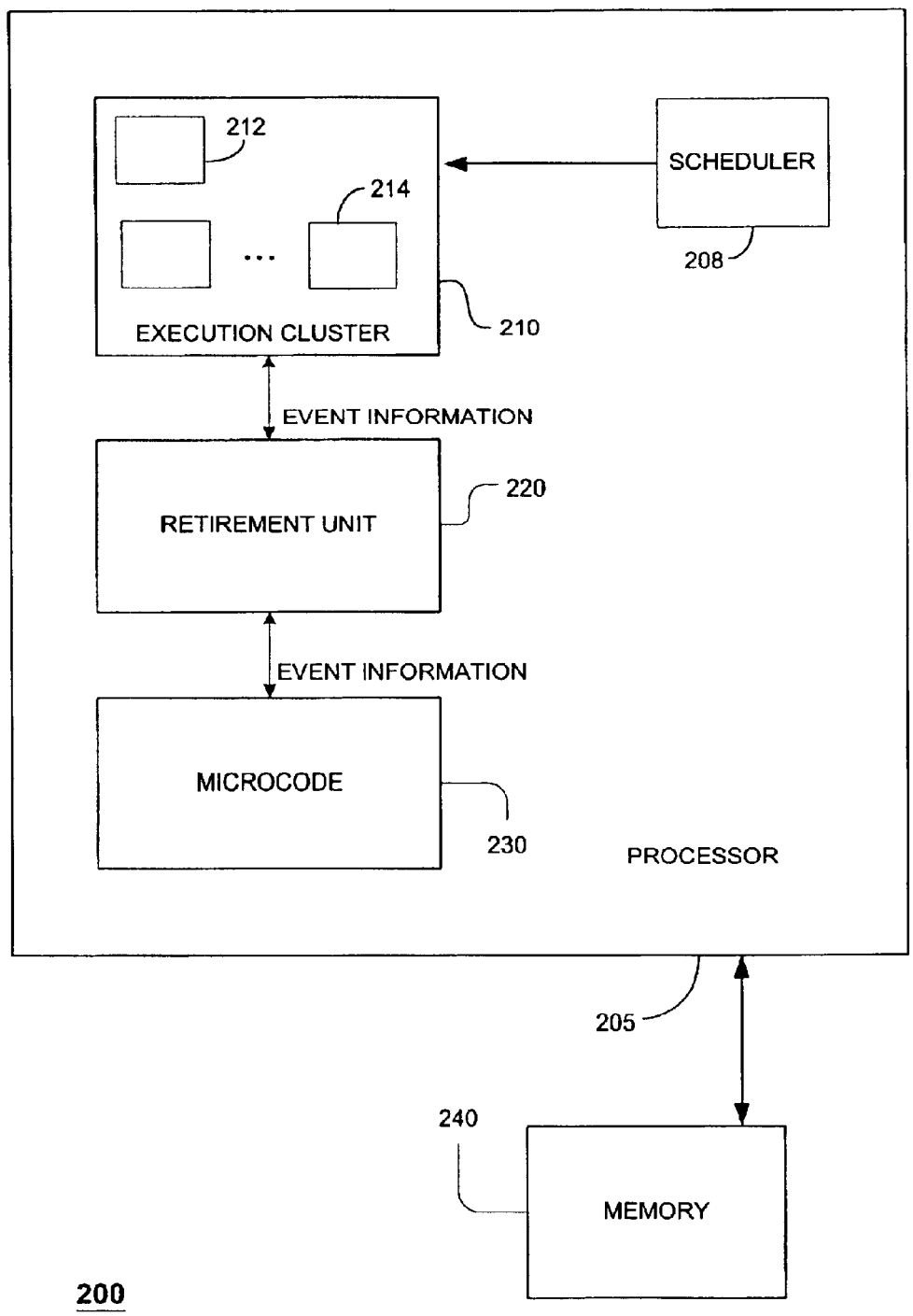
FIG. 2 is a block diagram of a processor for handling SIMD events and a memory for storing instructions causing a computer to handle SIMD events.

FIG. 2 shows a system 200 including a processor 205 that is configured to handle one or more SIMD events and to keep track of which data sets cause an event. The processor 205 includes a scheduler 208 coupled to an execution cluster 210. The execution cluster 210 includes a micro-operation decoder 212 and one or more execution units 214. The execution cluster 210 is coupled to a retirement unit 220. Each of the scheduler 208, the execution cluster 210, and the retirement unit 220 are implemented in hardware. The retirement unit 220 is also coupled to a microcode component 230 that is implemented in microcode.

The system 200 also includes a memory 240 that is coupled to the processor 205 and that may be used to store, at least temporarily, instructions for causing the processor 205 to handle SIMD events. Memory 240 may include random access memory ("RAM") or a hard disk, for example, to store (i) the instruction sequence that is being executed, (ii) the data that is being accessed by the instructions, and (iii) the software handler to handle unmasked SIMD events. Processor 205 also implicitly includes a memory such as, for example, a read-only memory ("ROM"), to store the microcode instructions of microcode 230. Given that other implementations may integrate memory 240 into the processor 205, memory 240 may be taken to refer to any memory coupled to the processor 205, whether internal or external to the processor 205.

The scheduler 208 sends micro-operations to the execution units 214 after data dependencies are resolved and hardware resources are available. The micro-operations can be out of order after they are sent to the execution units 214.

After successful execution of a micro-operation, the execution cluster 210 writes the results of the operation into a renamed destination register in a floating point register file and also writes "writeback" information into a "writeback" field. "Writeback" information is used by the retirement unit to determine, for example, if an event has to be signaled or not. One of the writeback encodings will represent the "no event" condition and if that is the case, then the retirement unit will successfully retire the micro-operation.

The writeback information associated with each micro-operation can be used to signal a variety of events and one such event is a SIMD event. In one implementation, the execution cluster uses the writeback field to inform the retirement unit about SIMD events while a memory cluster (not shown) uses the writeback field to inform the retirement unit about memory related events.

The execution units 214 determine the data set that caused an event and provide this information for inclusion in the writeback field. In one implementation, however, not all of the bits in the writeback field are used to determine if an eventing condition exists or not. For example, the execution cluster will include additional information in the writeback field about the data sets that caused events. Information about data sets that caused events is not used by the retirement unit; rather, it is used by the microcode. The data set information is put into the writeback field because microcode has access to the writeback information of the eventing micro-operation.

The data set information does include an indication of the data set that caused the event. Further, however, in one implementation, the micro-operation decoder 212 decodes the micro-operations and provides information about the data type, and the class (or type) of the micro-operation. The execution units 214 may provide information on the type of event, and, for SIMD events, the specific type of SIMD event.

The data type may be, for example, packed or scalar. The class of operation may be, for example, arithmetic or conversion, such as, for example, conversion to integer or conversion to floating point. The identify of the micro-operation may be, for example, a packed single-precision add instruction. The type of event may be, for example: a SIMD event, or more specifically, a SSE event or a SSE2 event; an x87 event; a MMX event; a paging event; and a segment event. The specific type of SIMD event may be, for example, denormal, invalid, precision, exponent underflow, exponent overflow, and divide by zero.

In one implementation, certain micro-operations always return the correct result but still call the microcode event handler to set the exception flags. Certain other micro-operations may call the microcode event handler to compute the result as well as set the appropriate exception flags for data sets that have an event. The microcode event handler determines if the results are correct or not based on the specific implementations.

The retirement unit 220 then processes the micro-operation. The retirement unit 220 tracks the micro-operations in program order and retires them in program order. The retirement unit 220 detects that an event occurred for a particular micro-operation by accessing and decoding the writeback field.

When the retirement unit detects an eventing condition by decoding the writeback information, the retirement unit sends signals to all other units in the processor to flush the pipelines. One of the actions performed by the execution cluster on an event is to copy the contents of the eventing micro-operation's renamed destination register to another register that microcode can access. In one implementation, microcode does not have access to the renamed registers and hence the need for the execution cluster to copy the contents of the renamed register to a register that can be accessed by microcode. The renamed destination register contains the correct results for data sets that do not have events and may contain incorrect results for data sets that do have events.

The retirement unit 220 also clears the processor of micro-operations occurring after the micro-operation that caused the event. The retirement unit 220 then transfers control to the appropriate microcode event handler, such as microcode 230, to handle the event. The retirement unit 220 is able to determine a pointer to the appropriate microcode event handler based on the type of the event. The microcode 230 has access to the writeback field and can, accordingly, determine which data set caused the event.

Figure 3:
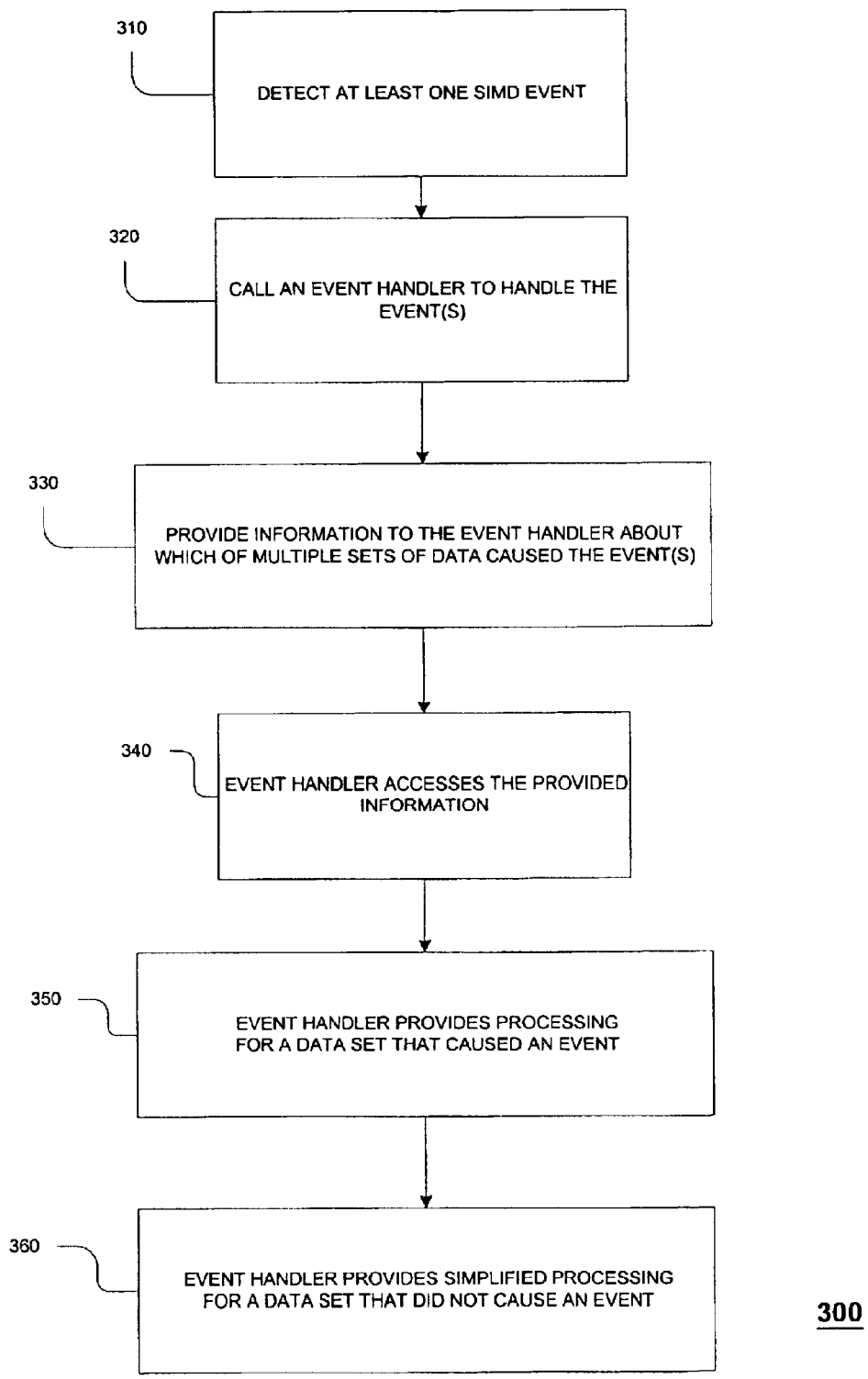
FIG. 3 is a flow chart of a process for detecting and handling SIMD events using the processor of FIG. 2.

FIG. 3 illustrates a process 300 for handling SIMD events. The processor 205, for example, can be used to perform the process 300, as explained below, and the memory 240, for example, can be used to store instructions for performing the process 300.

The process 300 includes detecting a SIMD event, examples of which were described earlier (310). In the processor 205, the execution cluster 210 generally detects SIMD events as the execution cluster 210 processes SIMD instructions using the cluster's floating point unit (not shown).

The process 300 continues by calling an event handler, such as microcode 230, to handle the detected SIMD event (320). For example, in the processor 205, the retirement unit 220 may decode the writeback information to detect that an event has occurred and may respond by calling the microcode component 230 to handle the event.

The process 300 continues by providing information, to the component handling the event, about which of the multiple sets of data caused the event (330). Providing the information may refer to making the information available. This may include, for example, sending the information, routing the information, or writing the information to a location accessible by the component handling the event.

In the processor 205, the retirement unit 220 makes the writeback field, including bits that indicate the data set that caused the event, available to the microcode component 230 by passing the writeback field to the microcode component 230 when the retirement unit 220 calls the microcode component 230. The retirement unit 220 receives the writeback field from the execution cluster 210 after the execution cluster 210 enters information indicating the data set that caused the event.

Figure 4:
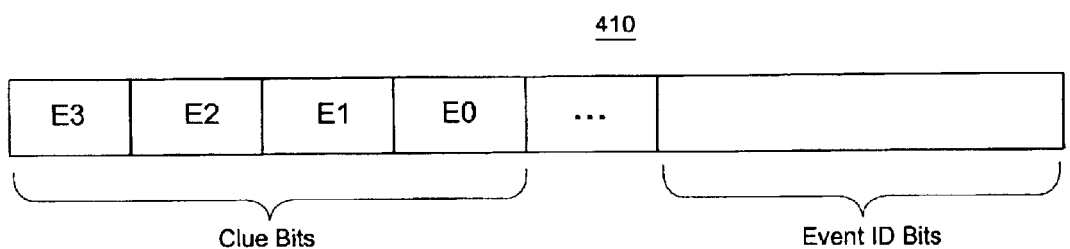
FIG. 4 is a block diagram of a data element for use by the process of FIG. 3.

Referring to FIG. 4, an implementation of a writeback field is shown including a data element 410 having clue bits and event identification bits. The clue bits indicate the data set that caused an event. If each data set caused an event, then each clue bit will be set. There are four clue bits, E0, E1, E2, and E3, that indicate whether or not the corresponding data set caused an event. The event identification bits indicate the type of event, or events, that occurred.

The clue bits can be determined by the execution cluster 210 as follows:

E3 is set in response to an event in SP3 (see FIG. 1) during execution of a packed, single-precision operation or an event in DP1 during execution of a packed, double-precision operation. E3 is clear for all other cases.

E2 is set in response to an event in SP2 during execution of a packed, single-precision operation. E2 is clear if there is no event in SP2 during execution of a packed, single-precision operation. The state of E2 is ignored for packed double-precision operations.

E1 is set in response to an event in SP1 during execution of a packed, single-precision operation or an event in DP0 during execution of a packed, double-precision operation. E1 is clear for all other cases.

E0 is set in response to an event in SP0 during execution of a packed, single-precision operation. E0 is clear if there is no event in SP0 during execution of a packed, single-precision operation. E0 is ignored for packed double-precision operations.

All, some, or none, of the clue bits may be set at any given time, and at least one will be set whenever the execution cluster 210 informs the retirement unit 220 that an event has occurred. The processor 205 can convey the clue bit information using a four-bit register or any other data element capable of conveying this information. One implementation uses the writeback field to convey this information, with the writeback field also including other information that is to be shared between components.

Some simplified implementations may share clue bits with other functions. For example, one implementation of the writeback field uses a clue bit location to indicate that there is an invalid exception flag for one or more specifically excepted instructions, such as, for example, the compare instruction. This bit location is also used as a clue bit for all instructions except for the one or more specifically excepted instructions. When the instruction is not one of the specifically excepted instructions, the bit location is used to convey a clue bit, and when the instruction is a specifically excepted instruction, the bit location is used to convey the invalid exception information. This dual use is possible because the components within the processor that receive the writeback field can also determine what the instruction is.

As another example, for scalar operations, that is, those operations that do not operate on multiple sets of data, the clue bits are used to convey additional information about the event that occurs. For example, information can be provided that identifies the type of micro-operation that caused the event. The event handler typically has to decode the micro-operation and determine the type of micro-operation in order to call the appropriate routine within the microcode event handler. Providing information about the micro-operation will enable the event handler to skip the type-decode logic and, hence, will result in a performance improvement.

Additionally, as stated earlier the execution cluster 210 may encode information about the sources of the micro-operation in the writeback field. That source information can be useful if the execution cluster 210 provides support for reading the register file indexed by the source information in the writeback field. The provision of information about the instruction and the sources of the micro-operation may allow the event handler to process the instruction that caused the event without accessing memory.

Another simplified implementation uses only two clue bits. One clue bit indicates whether there was an event in the bottom half of the data (SP0 and SP1, or DP0), and one clue bit indicates whether there was an event in the top half of the data (SP2 and SP3, or DP1). This information often allows the event handler to avoid processing all of the data sets.

The process 300 continues with the event handler accessing the provided information (340). Based on the accessed information, the event handler provides processing for a data set that caused an event (an eventing set of data) (350), and provides simplified processing for a data set that did not cause an event (a non-eventing set of data) (360). Simplified processing is processing that is quicker, or has fewer operations, for example, than the processing done for a data set that caused an event. Simplified processing is not restricted to performing only operations that are a strict subset of the operations performed for the non-simplified processing. That is, the operations performed during the processing can be, and in one implementation are, different depending on whether a data set triggered an event.

In the processor 205, the microcode component 230 accesses the provided information by receiving or reading the clue bits. The microcode component 230 then uses the information in the clue bits to determine which data sets caused an event and then to process each data set based on whether that data set caused an event.

Figure 5:
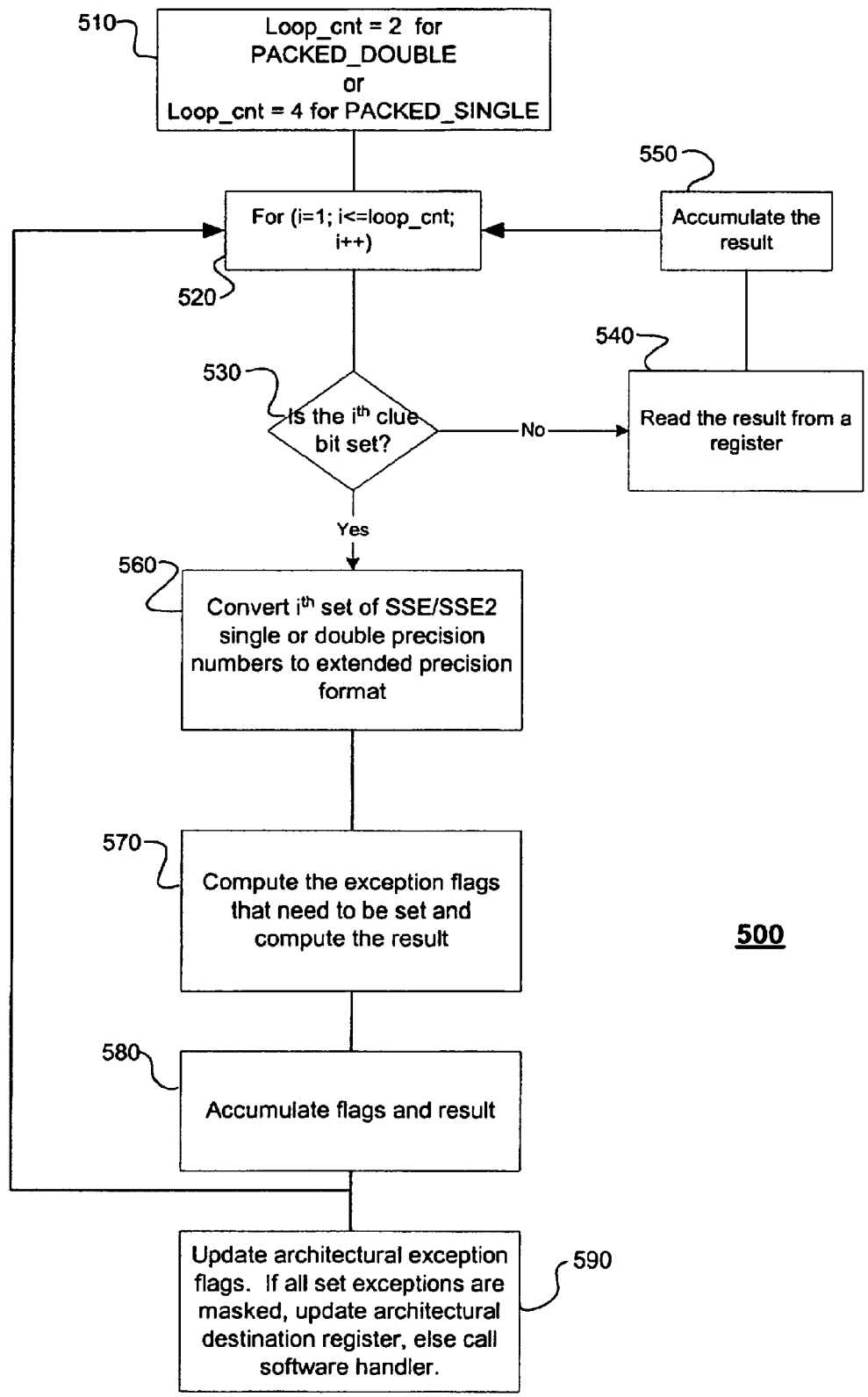
FIG. 5 is a flow chart of a process for processing data sets in an event handler.

Referring to FIG. 5, a process 500 is shown that may be used by an event handler to perform at least part of the operations 340, 350, and 360 of the process 300. A loop counter, referred to as loop_cnt, is set to either two or four (510). If the data is in a packed-double format then loop_cnt is set to two, because there are two sets of data that may have caused an event. If the data is in a packed-single format then loop_cnt is set to four, because there are four sets of data that may have caused an event.

A loop is initialized to execute "loop_cnt" number of times (520). A loop variable, referred to as "i," is initially set to one, and each execution of the loop processes one set of data.

Clue bit "i" is checked to see if that clue bit is set (530). In the implementation described above, clue bit "i" refers to one of E3-E0 for a packed-single format, and refers to one of E3 and E1 for a packed-double format.

If clue bit "i" is not set, then the corresponding data set did not cause an event and is processed accordingly. The result for that data set is read from a register (540), and the result is accumulated (550). If a particular data set did not cause an event, then the partial-result from that data set is available in a microcode accessible register. In this implementation, the partial-result is accessed and accumulated in sequence.

Accumulation refers generally to the process of aggregating or merging the result after each data set is processed. For example, consider the case where all four data sets in a packed, single-precision data type have events. After the first data set is handled, bits 31-0 of the result are available and are placed in a microcode temporary register. The destination register cannot be updated directly because it can be updated only after handling all exceptions and ensuring that all the exceptions are masked. After the second data set is handled, bits 63-32 of the result are available. Bits 63-32 of the result are then merged with bits 31-0 of the result in the microcode temporary register. After the third data set is handled, bits 95-64 of the result are available and are merged with bits 63-0 of the result. After the fourth data set is handled, bits 127-96 of the result are available and are merged with bits 95-0 of the result to form the complete result.

If clue bit "i" is set, then the corresponding data set is assumed to have caused an event and is processed accordingly. The data in the data set, which may include, for example, a SSE or SSE2 single or double precision number, is converted to an extended precision format (560). Exception flags that need to be set are computed, and the result of the instruction for that data set is computed using the extended precision format (570). The result is rounded to the destination precision format.

The flags and the result are then accumulated (580). In one implementation, the exception flags in each iteration are bitwise ORed with the exception flags from previous iterations. The result may be accumulated as described earlier.

When the loop has been executed for each data set, the architectural state is updated and a software handler is called if needed (590).

In one implementation, after all of the data sets have been handled, the result and the exception flags are available in microcode temporary registers. The architectural state for that implementation includes the architectural exception flags and the destination register. Once set, the architectural exception flags are set until cleared by software.

To update the architectural exception flags, the architectural exception flags are bitwise ORed with the (microcode) exception flags in the temporary register. As indicated above, for one implementation the bitwise OR operations are performed before exiting the loop. However, if any pre-assist flags are unmasked, then any post-assist flags that are detected are not reported.

Pre-assist events are those that can be detected without performing the micro-operation. Rather, pre-assist events can be detected by examining the source. Examples of pre-assist events include a denormal source event, an invalid event, and a divide-by-zero event. Post-assist events are those that are detected by performing the micro-operation and include, for example, an exponent underflow event, an exponent overflow event, and a precision event.

The destination register is conditionally updated. That is, if all exception flags that are set are also masked, then the destination register is updated and execution of the interrupted program resumes. However, if at least one exception flag that is set is unmasked, control is transferred to software without updating the destination register.

Even if software is called to handle an unmasked exception, the use of clue bits will typically increase the performance of the microcode event handler. This is because the microcode event handler will typically need to process each of the data sets and, by using clue bits, the time required for processing non-eventing data sets is reduced.

In the preceding discussion, the term "result" has been used to refer to the arithmetic result. However, the term "result" can be used more generally to refer to either the arithmetic result or the flag result (set or clear), depending on the context.

As indicated above, in handling the event, the event handler processes, or executes, the instruction that caused the event. Accordingly, the event handler may need, for example, to read from memory the instruction that caused the event, to determine the registers that were accessed, and to access those registers. Additional processes may be needed to complete the handling of an event. These additional processes may include, for example, setting flags, or returning to the instruction sequence after the instruction causing an event is processed. Performing these processes explains, in part, the length of time required for the event handler to execute in microcode. An event may be handled by the interaction of multiple components, in which case each component can be considered an event handler.

As described above, in one implementation, the event handler performs at least one task for each of the data sets that did not cause an event. In this implementation, the results of the micro-operation on the data sets that did not cause an event are stored in a register after the event occurs, and before the event handler is called. The event handler writes these results to the intended destinations.

The above-described implementations can be expanded in a number of ways. For example, one or more bits may be provided, in the writeback field or otherwise, for each data set to allow the hardware to indicate to the microcode whether a SIMD event is a pre-assist event or a post-assist event. Pre-assist/post-assist information may be provided in addition to, or in lieu of, information indicating the specific type of event. Information indicating whether an event is pre-assist or post-assist can be useful to an event handler. For example, if the event-handler knows that the event is a post-assist event, then the event handler does not have to decode the source and detect and service pre-assist events.

In certain implementations, the width of the writeback field may be limited and not be big enough to encode particular types of information. In these or other implementations, the clue bits or other information may be provided to the event handler using, for example, one or more special non-eventing micro-operations instead of using the writeback field. These special micro-operations may be part of the event handler microcode, and when executed by the execution cluster will return the desired information.

For example, in one implementation when a single-precision add micro-operation triggers an event, then the microcode event handler executes a micro-operation called, for example, single-precision-add-return-clue-bits. This micro-operation will not event and will return the event clue bits in the destination.

Similarly, a special micro-operation may be used to return the class of the micro-operation that triggered an event. In one implementation, the event handler fetches the macro-instruction from memory, and uses the macro-instruction opcode as a source for a special micro-operation called, for example, micro-operation-class that returns the class information for the micro-operation. A programmable logic array also could be used that accepts the macro-instruction opcode as input and returns the micro-operation class information as output.

In referring to SIMD instructions and events, the discussion encompasses more than those instructions and events labeled as SSE, SSE2, or SIMD. For example, the instructions need not adhere to any particular definition of parallel operation, nor even be executed in parallel. The same instruction merely needs to be executed on multiple sets of data. Further, each set of data need only have a single piece of information, such as, for example, one bit. The sets of data can be stored in any arrangement, including, for example, a packed format as discussed above. Other arrangements include putting all data elements in different registers or putting all operands for a given data set in a single register.

Referring again to FIG. 2, the components of the system 200 may be implemented by circuitry such as, for example, (i) one or more storage media having instructions stored thereon for performing various of the discussed operations, (ii) a processor, (iii) a controller, (iv) a logic device, and (v) one or more other devices capable of providing and/or executing instructions. A component refers to a logical or physical aspect of a system, or a combination of such aspects. A storage medium may include, for example, a read-only memory ("ROM"), a random-access memory ("RAM"), a hard disk, a floppy disk, a compact disc, and one or more other devices capable of storing instructions at least temporarily. The functionality of one or more of the described processes may be implemented by circuitry, such as, for example, (i) a processor including instructions stored in microcode, and (ii) a processor in conjunction with a floppy disc or other medium storing instructions.

The components of the processor 205 need not be physically contained in a single device. The processor 205 can also be included in a computer or other device, such as, for example, a personal digital assistant ("PDA"), an electronic organizer, an electronic game device, or a cellular phone. The processor 205 can be implemented using a structure or device capable of executing instructions, such as, for example, a microprocessor, a controller, or a logic device.

The microcode component 230 can be implemented by a structure capable of storing instructions, such as, for example, a ROM. Software implementations of an event handler may be implemented by a structure capable of storing instructions at least temporarily, such as, for example, a RAM.

The memory 240 can be implemented with, for example, a storage medium described above. The memory 240 may be contained in the processor 205.

The system 200 may be implemented by a combination of devices. For example, one computer may include the processor 205 and a second computer, connected over a network, may include the memory 240.

Figure 6:
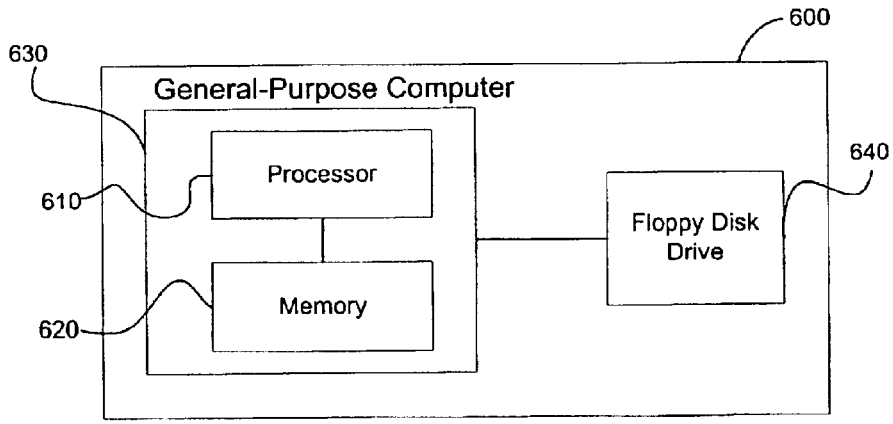
FIG. 6 is a block diagram of a general-purpose computer for handling SIMD events.

Referring to FIG. 6, the general-purpose computer 600 is one implementation of the system 200. The general-purpose computer 600 includes a processor 610 coupled to a memory 620, both of which are on a board 630. The general-purpose computer 600 also includes a floppy disk drive 640 that is coupled to the board 630.

The operations of the process 300, as well as the operations of other implementations discussed, can be performed entirely in hardware, such as, for example, in a processor or controller. Instructions for performing the operations of the process 300 may be stored in whole or in part in, for example, microcode, macrocode, firmware, or software. Software implementations include, for example, software emulating a processor or specific functions of a processor. Whether implemented in hardware, software, or otherwise, a state machine may be used.

Accumulating results or flags may include, in various implementations and for example, concatenating, performing a bitwise OR, performing a bitwise AND, or some combination.

A number of implementations have been described. Nevertheless, it will be understood that various modifications may be made. For example, the operations discussed as being performed by one or more of the specific components of the processor 205 may be performed by another component or by a combination of components, and the other component or combination of components may be within the processor 205 and/or external to the processor 205. Further, the operations and components described for the various implementations may be combined in different orders or arrangements, omitted, and supplemented by other operations and components not specifically described. Accordingly, other implementations are within the scope of the following claims.

What is claimed is:

1. A method comprising:
   determining a result for a non-eventing set of data, the non-eventing set of data being one of multiple sets of data, while processing a single micro-operation on the multiple sets of data in parallel;
   storing the result for the non-eventing set of data;
   detecting an event while processing the single micro-operation on an other of the multiple sets of data, wherein the other set is referred to as an eventing set;
   providing information to an event handler about which of the multiple sets of data caused the event;
   accessing, by the event handler, the provided information;
   determining by the event handler a result for the eventing set of data, and
   accumulating by the event handler the two results into an overall result of the single micro-operation for the multiple sets of data.

2. The method of claim 1 wherein:
   determining the result for the non-eventing set of data, storing the result, and detecting the event are performed by an execution unit of a processor while processing the micro-operation, and
   providing information to the event handler is performed by a retirement unit of the processor, and
   the event handler comprises microcode.

3. The method of claim 2 wherein providing information to the event handler comprises routing the information from the execution unit to the retirement unit, and from the retirement unit to the event handler.

4. The method of claim 1 further comprising:
   detecting a second event while processing the single micro-operation on a third of the multiple sets of data;
   providing information to the event handler about which of the multiple sets of data caused the second event;
   accessing by the event handler the information indicating which data set caused the second event; and
   determining by the event handler a result for the third set of data, wherein accumulating comprises accumulating the three results.

5. The method of claim 1 further comprising:
   providing information to the event handler indicating the type of the event; and
   accessing, by the event handler, the provided event-type information.

6. The method of claim 5 wherein:
   providing information indicating the type of the event comprises providing an indication that the event is a single-instruction/multiple data ("SIMD") event, and
   the method further comprises providing information to the event handler indicating a specific type of the SIMD event.

7. The method of claim 6 wherein providing information indicating the specific type of the SIMD event comprises providing an indication that the event is a denormal event, an invalid event, a precision event, an exponent underflow event, an exponent overflow event, or a divide by zero event.

8. The method of claim 6 wherein providing information indicating the specific type of the SIMD event comprises providing an indication that the event is a pre-assist event.

9. The method of claim 6 wherein providing information indicating the specific type of the SIMD event comprises providing an indication that the event is a post-assist event.

10. The method of claim 1 further comprising:
    providing information about a source of the micro-operation to the event handler; and
    accessing by the event handler the source information.

11. The method of claim 10 wherein the source information indicates that the source is from memory.

12. The method of claim 10 further comprising:
    determining, by the event handler and based on the source information, a non-memory location storing data that is also referenced by the source operand; and
    processing the micro-operation, by the event handler, using the non-memory location.

13. The method of claim 1 further comprising:
    providing information to the event handler indicating a class of the micro-operation, the class being determinable prior to any determination that the micro-operation produces an event on a data set; and
    accessing by the event handler the information indicating the class of the micro-operation.

14. The method of claim 13 wherein providing the information indicating the class comprises returning a result from an other micro-operation, the other micro-operation being part of microcode of the event handler and the other micro-operation accepting an opcode as a source operand and returning the class as the result.

15. The method of claim 13 wherein the class includes one or more of arithmetic and conversion.

16. The method of claim 13 further comprising selecting, by the event handler, a routine within the event handler based on the information indicating the class of the micro-operation.

17. The method of claim 1 wherein the provided information does not uniquely identify a particular set of data, from the multiple sets of data, as the set of data that caused the event but identifies a group of sets of data as possible sets of data that may have caused the event.

18. The method of claim 1 further comprising processing, by the event handler, each of the multiple sets of data, wherein the processing is simplified for any of the multiple sets of data that did not cause an event, compared to the processing for a set of data that did cause an event.

19. The method of claim 1 further comprising processing, by the event handler, each of the multiple sets of data serially.

20. The method of claim 1 further comprising processing, by the event handler, multiple sets of data in parallel.

21. The method of claim 1 wherein providing information to the event handler comprises returning a result from an other micro-operation, the other micro-operation being part of microcode of the event handler and returning the information about which of the multiple sets of data caused the event.

22. The method of claim 1 wherein providing information to the event handler comprises routing the information to the event handler.

23. The method of claim 1 further comprising copying the result of the non-eventing set of data to a location that can be accessed by the event handler.

24. The method of claim 1 wherein the multiple sets of data comprise four sets of data.

25. The method of claim 24, further comprising detecting events for each of the multiple sets of data while processing the multiple sets of data in parallel.

26. The method of claim 1 wherein accumulating comprising accumulating results for each of the multiple sets of data.

27. The method of claim 1 wherein:
the result for the non-eventing set of data is an arithmetic result, and
the result for the eventing set of data is an arithmetic result.

28. The method of claim 27 wherein accumulating the two arithmetic results comprises concatenating the two results into a single data location.

29. The method of claim 1 wherein:
the result for the non-eventing set of data is a flag result,
determining the flag result for the non-eventing set of data comprises determining that no flag needs to be set for the non-eventing set of data,
the result for the eventing set of data is a flag result, and
determining the flag result for the eventing set of data comprises determining that a flag needs to be set.

30. The method of claim 29 wherein accumulating the two flag results comprises bitwise ORing the two flag results.

31. The method of claim 1 wherein the overall result comprises a destination value produced by the single micro-operation after successful completion of the single micro-operation on the multiple sets of data.

32. The method of claim 31 wherein the event handler comprises a microcode portion that performs the accumulating.

33. A processor comprising:
an execution unit operable (i) to determine a result for a non-eventing set of data, the non-eventing set of data being one of multiple sets of data, while processing by a processor a single micro-operation on the multiple sets of data in parallel, (ii) to store the result for the non-eventing set of data, and (iii) to detect an event while processing the single micro-operation on another of the multiple sets of data, wherein the other set is referred to as an eventing set;
a retirement unit, in communication with the execution unit, operable to provide information to an event handler about which of the multiple sets of data caused the event; and
an event handler implemented in microcode and, when executed, able (i) to access the provided information, (ii) to determine a result for the eventing set of data, and (iii) to accumulate the two results into an overall result of the single micro-operation for the multiple sets of data.

34. The apparatus of claim 33 wherein the retirement unit is operable to provide the information to the event handler by routing a data element containing the information to the event handler.

35. The apparatus of claim 33 wherein:
the execution unit provides the event handler access to the result for the non-eventing set of data by copying the result for the non-eventing set of data to a location accessible by the event handler, and provides event type information to the retirement unit indicating that a SIMD event occurred, and
the retirement unit decodes the provided event type information to determine that a SIMD event occurred, halts execution of a program containing the micro-operation, and redirects control to the event handler that handles SIMD events.

36. A computer comprising a processor coupled to a memory wherein:
the processor includes an execution cluster, a retirement unit, and a microcode event handler,
one or more of the execution cluster and the retirement unit are operable, either collectively or individually, (i) to determine a result for a non-eventing set of data, the non-eventing set of data being one of multiple sets of data, while processing by a processor a single micro-operation on the multiple sets of data in parallel, (ii) to store the result for the non-eventing set of data, (iii) to detect an event while processing the single micro-operation on another of the multiple sets of data, wherein the other set is referred to as an eventing set, and (iv) to provide information to the event handler about which of the multiple sets of data caused the event, a type of the event, a class of the micro-operation, and a source of the micro-operation, and
the event handler, when executed by the processor, is able (i) to access the provided information, (ii) to determine a result for the eventing set of data, and (iii) to accumulate the two results into an overall result of the single micro-operation for the multiple sets of data.

37. A method of processing a micro-operation, the method comprising:
determining a result for a non-eventing set of data, the non eventing set of data being one of multiple sets of data, while processing by a processor a single micro-operation on the multiple sets of data in parallel;
storing the result for the non-eventing set of data;
detecting an event while processing the single micro-operation on another an other of the multiple sets of data, wherein the other set is referred to as an eventing set;
providing information to an event handler about which of the multiple sets of data caused the event, wherein the provided information does not uniquely identify a particular set of data, from the multiple sets of data, as the set of data that caused the event but identifies a group of sets of data as possible sets of data that caused the event;
accessing, by the event handler, the provided information;
determining by the event handler a result for the eventing set of data; and
accumulating by the event handler the two results into an overall result of the single micro-operation for the multiple sets of data.

* * * * *